(12) United States Patent
Sawa et al.

(10) Patent No.: US 10,995,211 B2
(45) Date of Patent: May 4, 2021

(54) OXYGEN-ABSORBING RESIN COMPOSITION CONTAINING ORGANIC OXYGEN ABSORBER

(71) Applicant: TOYO SEIKAN GROUP HOLDINGS, LTD., Tokyo (JP)

(72) Inventors: Yoshiki Sawa, Yokohama (JP); Toshiki Yamada, Yokohama (JP); Yukiko Hirayama, Yokohama (JP); Kanna Muramatsu, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 21 days.

(21) Appl. No.: 16/321,138

(22) PCT Filed: Aug. 4, 2017

(86) PCT No.: PCT/JP2017/028412
§ 371 (c)(1),
(2) Date: Jan. 28, 2019

(87) PCT Pub. No.: WO2018/025995
PCT Pub. Date: Feb. 8, 2018

(65) Prior Publication Data
US 2019/0161610 A1 May 30, 2019

(30) Foreign Application Priority Data

Aug. 4, 2016 (JP) .............................. JP2016-153412

(51) Int. Cl.
| | |
|---|---|
| *C08L 67/02* | (2006.01) |
| *B65D 81/26* | (2006.01) |
| *C08K 5/098* | (2006.01) |
| *C08K 5/3417* | (2006.01) |
| *B65D 1/02* | (2006.01) |
| *C08K 5/1539* | (2006.01) |
| *B65D 65/40* | (2006.01) |
| *C08K 5/20* | (2006.01) |

(52) U.S. Cl.
CPC ................ *C08L 67/02* (2013.01); *B65D 1/02* (2013.01); *B65D 65/40* (2013.01); *B65D 81/26* (2013.01); *C08K 5/098* (2013.01); *C08K 5/1539* (2013.01); *C08K 5/20* (2013.01); *C08K 5/3417* (2013.01); *B65D 1/0207* (2013.01); *C08K 2201/012* (2013.01)

(58) Field of Classification Search
USPC .......................................................... 524/94
See application file for complete search history.

(56) References Cited

U.S. PATENT DOCUMENTS

| | | |
|---|---|---|
| 6,429,243 B1 | 8/2002 | Okamoto et al. |
| 8,758,644 B2 | 6/2014 | Share et al. |
| 9,018,284 B2 | 4/2015 | Akkapeddi et al. |
| 9,764,308 B2 | 9/2017 | Yamada et al. |
| 2005/0139806 A1 | 6/2005 | Havens et al. |
| 2005/0245677 A1 | 11/2005 | Tsukamoto |
| 2008/0255280 A1 | 10/2008 | Sims et al. |
| 2013/0149479 A1* | 6/2013 | Otaki ...................... C08L 77/12 428/35.7 |
| 2013/0306905 A1 | 11/2013 | Akkapeddi et al. |
| 2014/0335297 A1 | 11/2014 | Sawa et al. |
| 2017/0066903 A1 | 3/2017 | Sawa et al. |

FOREIGN PATENT DOCUMENTS

| | | |
|---|---|---|
| EP | 1 548 047 A1 | 6/2005 |
| EP | 1 548 048 A1 | 6/2005 |
| JP | 5-228988 A | 9/1993 |
| JP | 10-231414 A | 9/1998 |
| JP | 2001-150522 A | 6/2001 |
| JP | 2003-082209 A | 3/2003 |
| JP | 2004-131118 A | 4/2004 |
| JP | 2004-161796 A | 6/2004 |
| JP | 2005-187714 A | 7/2005 |
| JP | 2009-173033 A | 8/2009 |
| JP | 2010-523799 A | 7/2010 |
| JP | 2013-531084 A | 8/2013 |
| JP | 2015-137295 A | 7/2015 |
| JP | 2015-174895 A | 10/2015 |
| WO | 2005/003235 A1 | 1/2005 |
| WO | 2012/102086 A1 | 8/2012 |
| WO | 2013/099921 A1 | 7/2013 |

OTHER PUBLICATIONS

Communication dated Mar. 24, 2020, from the Japanese Patent Office in corresponding application No. 2016-153412.
International Search Report for PCT/JP2017/028412 dated Aug. 29, 2017 [PCT/ISA/210].
Extended European Search Report dated Feb. 7, 2020, issued by the European Patent Office in application No. 17837096.1.

* cited by examiner

*Primary Examiner* — Terressa Boykin
(74) *Attorney, Agent, or Firm* — Sughrue Mion, PLLC

(57) ABSTRACT

An oxygen-absorbing resin composition containing an ethylene terephthalate type polyester resin and an organic oxygen absorber and, further, containing cobalt in an amount of 5 to 50 ppm and titanium in an amount of 1 to 15 ppm calculated as elements.

9 Claims, No Drawings

OXYGEN-ABSORBING RESIN COMPOSITION CONTAINING ORGANIC OXYGEN ABSORBER

TECHNICAL FIELD

This invention relates to an oxygen-absorbing resin composition containing an organic oxygen absorber. More specifically, the invention relates to an oxygen-absorbing resin composition containing an ethylene terephthalate type polyester resin and an organic oxygen absorber, and to a container formed by using the oxygen-absorbing resin composition.

BACKGROUND ART

Ethylene terephthalate type polyester resins excel in such properties as formability, transparency, mechanical strength and resistance against chemicals and, further, have relatively high barrier properties against oxygen and the like. Therefore, they have been used in a variety of fields as packaging materials such as films, sheets and bottles. To improve the gas-barrier property of such packaging materials, further, there have also been known multilayered structures which include, as an intermediate layer, a layer of a gas-barrier resin such as a saponified product of an ethylene/vinyl acetate copolymer or a polyamide having excellent gas-barrier property between an inner layer and an outer layer of a polyester resin via suitable adhesive resin layers.

From the standpoint of saving resources and decreasing the weight of the packaging containers such as polyester bottles that have been placed in the market, moreover, it has been desired to further decrease the thickness of the body portions. To meet the above requirement, however, it becomes necessary, as a matter of course, to suppress a decrease in the barrier property against oxygen and the like gases caused by a reduction in the thickness. In an embodiment that uses the gas-barrier resin, in this case, the container must be formed in a multiplicity of layers to shut off the permeation of gases making it, therefore, difficult to decrease the thickness of the container to a sufficient degree.

In order to improve barrier property against oxygen and the like gases without using the gas-barrier resin, there has been known a means that uses an inorganic oxygen absorber such as iron powder. The oxygen absorber by itself undergoes oxidation and absorbs oxygen; i.e., exhibits barrier property to shut off the permeation of oxygen upon absorbing oxygen. However, the inorganic oxygen absorber causes the resins to be colored and, therefore, cannot be used in the field of packaging where transparency is required. In the field of packaging, therefore, it is a general practice to use an organic oxygen absorber that does not cause the resins to be colored.

The organic oxygen absorber is a compound that has an aliphatic unsaturated bond, and absorbs oxygen as oxygen reacts with the carbon-carbon unsaturated bond. A patent document 1, for example, proposes an oxygen-absorbing resin composition containing an organic oxidizing component (organic oxygen absorber) such as unmodified polybutadiene or maleic anhydride-modified polybutadiene.

Further, a patent document 2 proposes an oxygen-trapping composition that contains a compound having an unsaturated alicyclic structure (cyclohexene structure) as an organic oxygen absorber.

Further, patent documents 3 to 5 filed by the present applicant are proposing oxygen-absorbing resin compositions containing, as an organic oxygen absorber, an acid anhydride represented by the following formula,

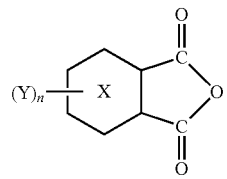

wherein the ring X is an aliphatic ring having an unsaturated bond, n is a number of zero or 1, and Y is an alkyl group, a derivative derived from the above acid anhydride, such as ester, amide, imide or dicarboxylic acid; or a polymer containing a constituent unit derived from the above acid anhydride.

Further, a patent document 6 is proposing an oxygen-absorbing resin composition containing, as an organic oxygen absorber, a bisimide obtained by reacting the acid anhydride represented by the above formula with an aromatic diamine.

The above-mentioned organic oxygen absorbers, however, are also containing transition metal catalysts for accelerating the reaction (oxidation) with oxygen. It has been known that cobalt type catalysts work most effectively as the transition metal catalysts.

The above patent documents 3 to 6 are describing that the transition metal catalysts (cobalt catalysts) are used in amounts of at least about 10 ppm. According to the study conducted by the present inventors, however, the transition metal catalysts must be added at a concentration of at least not less than 70 ppm to realize the oxygen-absorbing capability (oxidizing capability) to a sufficient degree in a region where the organic oxygen absorber is contained at a low concentration.

However, the transition metal catalyst and, specifically, the cobalt catalyst is very expensive, and it has been desired to express the oxygen-absorbing capability to a sufficient degree by using the catalyst in amounts as small as possible.

Further, when the cobalt catalyst is used in large amounts, the ethylene terephthalate type polyester resin which is the base material, too, is oxidized and deteriorated causing a decrease in the strength of the container wall and developing yellow color. Such a decrease in the strength could cause a serious problem when it is attempted to reduce the thickness of the container wall. Moreover, yellow color tends to appear conspicuously as the container wall is formed in a reduced thickness. From these points of view, therefore, it has been urged to decrease the amount of the cobalt catalyst that is used.

PRIOR ART DOCUMENTS

Patent Documents

Patent document 1: JP-A-2004-161796
Patent document 2: JP-T-2010-523799
Patent document 3: WO2012/102086
Patent document 4: WO2013/099921
Patent document 5: JP-A-2015-174895
Patent document 6: JP-A-2013-531084

OUTLINE OF THE INVENTION

Problems that the Invention is to Solve

It is, therefore, an object of the present invention to provide an oxygen-absorbing resin composition which contains an ethylene terephthalate type polyester resin and an organic oxygen absorber and, further, contains a cobalt catalyst as a catalyst for accelerating the oxidation of the organic oxygen absorber, the oxygen-absorbing resin composition exhibiting improved oxygen-absorbing capability despite of containing the cobalt catalyst in a decreased amount.

Another object of the present invention is to provide a container having a layer formed by using the above oxygen-absorbing resin composition.

Means for Solving the Problems

The present inventors have conducted experiments extensively concerning the oxygen-absorbing capability (capability to be oxidized) of an organic oxygen absorber dispersed in an ethylene terephthalate type polyester resin by using a cobalt catalyst, and have studied the results. As a result, the inventors have discovered an astonishing fact in that upon using a titanium compound in trace amounts as a catalyst component, the oxygen-absorbing capability can be improved even by greatly decreasing the amount of the cobalt catalyst. Besides, when the titanium compound is used in combination, the oxygen-absorbing capability rather decreases if the cobalt catalyst is used in such amounts that have heretofore been adopted. The inventors have thus completed the present invention.

According to the present invention, therefore, there is provided an oxygen-absorbing resin composition containing an ethylene terephthalate type polyester resin and an organic oxygen absorber and, further, containing cobalt in an amount of 5 to 50 ppm and titanium in an amount of 1 to 15 ppm calculated as elements.

According to the present invention, further, there is provided a formed body of a single-layer or a multilayer structure having a layer formed by using the above oxygen-absorbing resin composition.

The formed body is, usually, used as a container or a preform for forming a container.

In the oxygen-absorbing resin composition of the present invention, it is desired that:
(1) The cobalt is contained at a concentration of 10 to 30 ppm;
(2) The organic oxygen absorber is contained in an amount of 0.5 to 2.0% by mass;
(3) The organic oxygen absorber is at least the one selected from the group consisting of an acid anhydride represented by the following formula (1),

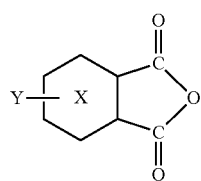

(1)

wherein the ring X is an aliphatic ring having an unsaturated bond, and Y is an alkyl group,
an ester, an amide, an imide or a dicarboxylic acid derived from the acid anhydride, and a polymer having a constituent unit derived from the acid anhydride;
(4) The organic oxygen absorber is a non-polymer type compound having a molecular weight of not more than 1000;

(5) The organic oxygen absorber is a bisimide compound derived from the above acid anhydride and a diamine; and
(6) The organic oxygen absorber is an aliphatic bisimide compound derived from the acid anhydride and an aliphatic diamine.

Effects of the Invention

According to the present invention, it is made possible to realize a large oxygen-absorbing capability by containing, in a composition, titanium in a small amount in combination with cobalt, i.e., by using a cobalt catalyst in such a small amount that the concentration of cobalt is 5 to 50 ppm and, specifically, 10 to 30 ppm calculated as element.

Referring, for example, to Examples appearing later, the oxygen-free water was filled in a 500-mL bottle formed by using the oxygen-absorbing resin composition obtained by containing a cobalt catalyst and titanium in an ethylene terephthalate type polyester resin (hereinafter often called simply PET) according to the present invention. After the oxygen-free water was stored therein in an environment of 23° C. 50% RH for one week, the concentration of oxygen dissolved in water was measured to be not more than about 0.4 ppm and, specifically, down to nearly 0.2 ppm in contrast with about 1.0 ppm in the case of the PET alone. In the case of the bottle formed by using the oxygen-absorbing resin composition containing the cobalt catalyst only but without titanium, on the other hand, the cobalt catalyst must be added in an amount of not less than about 70 ppm if it is attempted to lower the concentration of oxygen dissolved in water down to a level comparable to that of the present invention.

It will, therefore, be understood that according to the present invention, a high degree of oxygen-absorbing capability can be exhibited by using the cobalt catalyst in an amount that is greatly reduced.

According to the results of the above experiments, further, when titanium was also contained, it was confirmed that the concentration of oxygen that dissolved in water rather increased as the amount of the cobalt catalyst increased in excess of the range specified by the present invention. That is, quite an unexpected result was confirmed in that if the amount of the cobalt catalyst increased in excess of a certain amount while titanium was also contained, the oxygen-absorbing capability did not increase but rather decreased.

The behavior of oxygen-absorbing capability due to the co-presence of titanium was confirmed through experiments but the reason for it has not been clarified yet. The inventors presume that titanium and cobalt are acting synergistically on the oxidation reaction of the organic oxygen absorber.

As described above, the oxygen-absorbing resin composition of the present invention helps greatly decrease the amount of the expensive cobalt catalyst and realizes excellent oxygen-absorbing capability. Therefore, the oxygen-absorbing resin composition is very advantageous in reducing the cost and also in reducing the thickness of the container wall while avoiding excess of oxidation and deterioration due to the use of the cobalt catalyst in large amounts.

Modes for Carrying Out the Invention

The oxygen-absorbing resin composition of the present invention contains a base material resin (A) (i.e., a resin component that serves as a matrix), an organic oxygen absorber (B) and a catalytic component (C) and, further, contains, as required, blending agents that have been known per se. and that are added to the resin compositions of this kind.

<Base material Resin (A)>

As the base material resin (A), there can be used an ethylene terephthalate type polyester resin or, concretely, a polyethylene terephthalate (PET) obtained from a terephthalic acid and an ethylene glycol.

The polyethylene terephthalate, usually, has a glass transition point (Tg) of 50 to 90° C. and, specifically, 55 to 80° C., and a melting point (TM) in a range of 200 to 275° C. and, specifically, 220 to 270° C.

So far as the basic properties of the polyethylene terephthalate are not impaired, further, it is also allowable to preferably use a copolymerized polyester containing ester units derived from a dibasic acid other than the terephthalic acid and a diol unit other than the ethylene glycol provided, for example, the ester recurring unit contains the ethylene terephthalate unit in an amount of not less than 70% by mol and, specifically, not less than 80% by mol. As the dibasic acid other than the terephthalic acid, there can be exemplified aromatic dicarboxylic acids such as isophthalic acid, phthalic acid and naphthalenedicarboxylic acid; alicyclic dicarboxylic acids such as cyclohexanedicarboxylic acid, etc.; and aliphatic dicarboxylic acids such as succinic acid, adipic acid, sebacic acid and dodecanedioic acid, which may be used in one kind or in a combination of two or more kinds. As the diol component other than the ethylene glycol, there can be exemplified propylene glycol, 1,4-butanediol, diethylene glycol, 1,6-hexylene glycol, cyclohexanedimethanol and ethylene oxide adduct of bispheol A, which may be used in one kind or in two or more kinds.

The polyester should have a molecular weight which is at least large enough for forming a film and is desired to have an intrinsic viscosity (I.V.) which is, usually, in a range of 0.6 to 1.4 dl/g and, specifically, 0.63 to 1.3 dl/g.

<Organic Oxygen Absorber (B)>

In the invention, the organic oxygen absorber (B) that absorbs oxygen is, preferably, the one that has been known per se., such as polyene polymer having an aliphatic unsaturated bond like polybutadiene or polyisoprene; or a compound having an unsaturated alicyclic structure. The organic oxygen absorber is free from a problem of developing color and can be favorably used in a field where transparency is required. The organic oxygen absorber, further, has favorable resistance against the heat and does not impair excellent properties of the PET that is used as the base material. Specifically, the compound having an unsaturated alicyclic structure, when brought into contact with oxygen, is easily oxidized at the portion of the unsaturated bond in the ring absorbing, therefore, oxygen, and hence exhibits oxygen-absorbing capability. For instance, the unsaturated bond in the aromatic ring does not exhibit the capability of being oxidized.

In the invention, the compound having the above-mentioned unsaturated alicyclic structure (compound of the unsaturated alicyclic structure) can be exemplified by methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene and dicyclopentadiene. Specifically, the present invention, preferably, uses the one selected from the group consisting of an acid anhydride represented by the following formula (1),

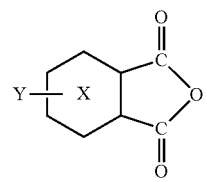

(1)

wherein ring X is an aliphatic ring having an unsaturated bond, and Y is an alkyl group,
an ester, an amide, an imide or a dicarboxylic acid derived from the above acid anhydride, and a polymer having a constituent unit derived from the above acid anhydride.

In the above formula (1), the aliphatic ring X is a 6-membered ring having an unsaturated bond, i.e., a cyclohexene ring. The unsaturated bond may be either at the third position or the fourth position but, particularly preferably, is at the third position from the standpoint of capability of being oxidized. There is no particular limitation on the alkyl group. Usually, however, it is desired to use a lower alkyl group having not more than 3 carbon atoms and, particularly, to use a methyl from the standpoint of synthesis and capability of being oxidized. The alkyl group or the methyl group may, usually, be bonded at either the third position or the fourth position. The acid anhydride (alkyltetrahydrophthalic anhydride) is obtained by the Diels-Alder reaction of the maleic anhydride with the diene. The acid anhydride is obtained in the form of a mixture of isomers thereof, and can be used in the form of a mixture as the oxygen-absorbing component (B).

In the present invention, the most preferred examples of the above acid anhydride include a 3-methyl-$\Delta^4$-tetrahydrophthalic anhydride presented by the following formula (2) and a 4-methyl-$\Delta^3$-tetrahydrophthalic anhydride presented by the following formula (3).

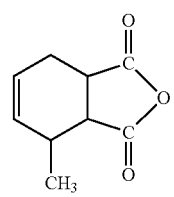

(2)

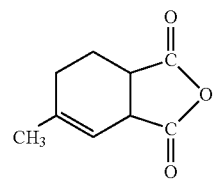

(3)

The above acid anhydride is capable of forming a derivative by a method known per se. So far as the unsaturated alicyclic structure is maintained, the derivative can be used as the oxygen-absorbing component (B). That is, the ester, amide, imide or dicarboxylic acid derived from the above acid anhydride can be used as the oxygen-absorbing component (B).

The above ester is an ester obtained by reacting an acid anhydride such as alkyltetrahydrophthalic anhydride with various alcohols. The alcohol used for the esterification is riot specifically limited, and there can be used either an aliphatic alcohol such as methyl alcohol, ethyl alcohol or an aromatic alcohol such as phenol. It is, further, allowable to use a polyhydric alcohol such as glycol. In this case, it is allowed to introduce the unsaturated alicyclic structures in a number corresponding to the number of alcohols in a molecule.

Moreover, the ester may be a partial ester of the above acid anhydride. Namely, the ester is expressed by, for example, the following formulas.

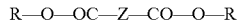

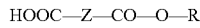

or

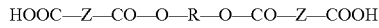

wherein Z is an unsaturated alicyclic ring possessed by the acid anhydride, and R is an organic group derived from the alcohol used for the reaction.

The above amide is obtained by reacting an acid anhydride such as alkyltetrahydrophthalic anhydride with various amine compounds.

The amine to be used is not specifically limited, and there can be used any aliphatic amine such as methylamine, ethylamine or propylamine, or any aromatic amine such as phenylamine. Further, the amine to be used may be either the one of which one of the two carbonyl groups forming the acid anhydride has been amidated or the one of which both of the two carbonyl groups have been amidated. Moreover, not being limited to the monoamine, there can be also used a polyvalent amine such as diamine triamine. In this case, it is allowed to introduce the unsaturated alicyclic structures in a number corresponding to the number of amines in a molecule.

Further, the imide is obtained by heat-treating or imidizing the above amide. The imide, for instance, is obtained by heat-treating the amide represented by the following formula;

HOOC—Z—CONH—R or

HOOC—Z—CONH—R—CONH—Z—COOH wherein Z is an unsaturated alicyclic ring possessed by the acid anhydride, and R is an organic group derived from the amine used for the reaction,
and is represented by the following formula;

Z—(CO)$_2$—N—R or

Z—(CO)$_2$—N—R—N—(CO)$_2$—Z wherein Z and R are as defined above.

Moreover, the dicarboylic acid is the one that is formed as the acid anhydride is hydrolyzed and the acid anhydride group thereof is cleaved, and is represented by the following formula;

HOOC—Z—COOH wherein Z and R are as defined above.

Moreover, the polymer having a constituent unit derived from the above acid anhydride, too, can be used as the oxygen-absorbing component (B). Namely, the acid anhydride represented by the above-mentioned formula (1) can he used as a dibasic acid component for forming a polyester. Such a copolymerized polyester has an unsaturated alicyclic structure in the molecular chain thereof and hence exhibits a predetermined oxygen-absorbing capability (capability of being oxidized) and, therefore, can be used as the oxygen-absorbing component (B). Specifically, the copolymerized polyester has a very high degree of affinity to the polyester resin that is used as the base material resin (A), and is very suited for homogeneously dispersing the oxygen-absorbing component (B) therein.

In the present invention, further, among the acid anhydrides or the compounds derived from the acid anhydrides represented by the above general formula, it is particularly desired to use a non-polymer type compound having a molecular weight of not more than 2000 and, more preferably, not more than 1000 (i.e., a compound without recurring unit in the molecules thereof). The non-polymer type compound of such a low molecular weight has high mobility of molecules, is highly reactive with, specifically, oxygen, and exhibits a high degree of oxygen-absorbing capability. Further, among the non-polymer type compounds of such low molecular weights, the imide compound exhibits a particularly high oxygen-absorbing capability and is more favorably used, the imide compound being the one that is obtained by heat-treating the amide which is a reaction product of the acid anhydride of the above general formula (1) with the amine.

As the amine used for producing the imide compound, there can be used either the aliphatic amine or the aromatic amine. Most desirably, however, there is used the amide compound obtained by reacting the aliphatic amine. That is, the imide compound obtained by reacting the aliphatic amine has a glass transition point lower than that of the imide compound obtained from the aromatic amine. When used, for example, as a container, therefore, the imide compound obtained by reacting the aliphatic amine features a high mobility of molecules in an environment in which it is used and, as a result, exhibits a higher oxygen-absorbing capability.

Among the above aliphatic amines, it is most desired to use the imide compound obtained by reacting an aliphatic monoamine having not more than 20 carbon atoms or an aliphatic diamine with the acid anhydride followed by the treatment with heat.

As the aliphatic monoamine and aliphatic diamine, there can be exemplified alkylamines or alkylenediamines, such as methylamine, methylenediamine, propylamine, propylenediamine, butylamine, butylenediamine, pentylamine, pentamethylenediamine, hexylamine, hexamethylenediamine, heptylamine, heptamethylenediamine, octylamine, octamethylenediamine, nonylamine, nonamethylenediamine, decylamine, decamethylenediamine, undecylamine, undecamethylenediamine, dodecylamine, dodecamethylenediamine, tridecylamine, tridecamethylenediamine, tetradecylamine, tetradecamethylenediamine, pentadecylamine, pentadecamethylenediamine, hexadecylamine, hexadecamethylenediamine, heptadecylamine, heptadecamethylenediamine, octadecylamine, octadecamethylenediamine, nonadecylamine, nonadecamethylenediamine and eicosylamine.

In the present invention, the above-mentioned oxygen absorber (B) is used in such an amount that it absorbs oxygen to a sufficient degree but does not impair such properties as formability of the ethylene terephthalate type polyester resin that is used as the base resin (A). Concretely speaking, the amount thereof cannot be strictly specified since it is subject to vary depending upon the mode of use. In general, however, the amount thereof is preferably in a range of 0.1 to 5.0% by mass and, specifically, 0.5 to 2.0% by mass in the oxygen-absorbing resin composition.

<Catalyst Component (C)>

The present invention uses the catalyst component (C) in order to accelerate the oxidation of the oxygen absorber (B) and to improve the oxygen-absorbing capability. As the catalyst component, there are used a cobalt type catalyst and a titanium type catalyst in combination.

The cobalt type catalyst and the titanium type catalyst assume the form of oxides of metals thereof (e.g., titanium oxide, etc.), inorganic acid salts thereof, organic acid salts thereof or complex salts thereof.

As the inorganic acid salts, there can be exemplified halides such as chlorides, oxoacid salts of sulfur such as sulfates, oxoacid salts of nitrogen such as nitrates, oxoacid salts of phosphorous such as phosphates and silicates.

As the organic acid salts, on the other hand, there can be exemplified carboxylates, sulfonates and phosphonates. Among them, however, carboxylates are suited for the object of the present invention. As the concrete examples thereof, there can be described metal salts, such as of acetic acid, propionic acid, isopropionic acid, butanoic acid, isobutanoic acid, pentanoic acid, isopetanoic acid, hexanoic acid, heptanoic acid, isoheptanoic acid, octanoic acid, 2-ethylhexanoic acid, nonanoic acid, 3,5,5-trimethylhexanoic acid, decanoic acid, neodecanoic acid, undecanoic acid, lauric acid, myristic acid, palmitic acid, margaric acid, stearic acid, arachic acid, linderic acid, tsuzuic acid, petroselinic acid, oleic acid, linoleic acid, linolenic acid, arachidonic acid, formic acid, oxalic acid, sulfamic acid and naphthenic acid.

As the complex salts of cobalt and titanium, there can be used complex salts thereof with β-diketone or β-keto-acid ester. As the β-diketone or β-keto-acid ester, there can be used acetylacetone, acetoacetic acid ethyl, 1,3-cyclohexanedion, methylenebis-1,3-cyclohexadion, 2-benzyl-1,3-cyclohexadion, acetyltetralone, parmitoyltetralone, stealoyltetralone, benzoyltetralone, 2-acetylcyclohexanone, 2-benzoylcyclohexanone, 2-acetyl-1,3-cyclohexanedion, benzoyl-p-chlorobenzoylmethane, bis(4-methylbenzoyl)methane, bis(2-hydroxybenzoyl)methane, benzoylacetone, tribenzoylmethane, diacetylbenzoylmethane, stearoylbenzoylmethane, parmitoylbenzoylmethane, lauroylbenzoylmethane, dibenzoylmethane, bis(4-chlorobenzoyl)methane, bis(methylene-3,4-dioxybenzoyl)methane, benzoylacetylphenylmethane, stearoyl(4-methoxybenzoyl)methane, butanoylacetone, distearoylmethane, acetylacetone, stearoylacetone, bis(cyclohexanoyl)-methane and dipivaroylmethane.

The present invention uses the titanium catalyst in combination with the cobalt catalyst; i.e., the cobalt catalyst is used in an amount that is greatly reduced yet exhibiting a high degree of oxygen-absorbing capability.

That is, the oxygen-absorbing resin composition of the present invention needs contain the cobalt catalyst in an amount of 5 to 50 ppm and, specifically, 10 to 30 ppm calculated as element. The oxygen-absorbing resin composition expresses a high degree of oxygen-absorbing capability despite of using the cobalt catalyst in an amount that is very smaller than that used in the conventional oxygen-absorbing resin compositions. Very unexpectedly, furthermore, if the amount of the cobalt catalyst is not smaller than the above-mentioned range, then the oxygen-absorbing capability rather decreases (see Examples appearing later).

The titanium catalyst is used in combination with the cobalt catalyst and in an amount in a range of 1 to 15 ppm and, specifically, 2 to 10 ppm calculated as element. If the amount thereof is small, then it becomes difficult to express a high degree of oxygen-absorbing capability unless the cobalt catalyst is used in large amounts. Further, even if the titanium catalyst is used in unnecessarily large amounts, the oxygen-absorbing capability cannot be improved any more but causing disadvantage in cost.

Of the above catalyst components, the titanium catalyst is also often used as a catalyst for polymerizing the ethylene terephthalate type polyester resin which is the base resin. Therefore, when it is attempted to use, as the base resin, the ethylene terephthalate type polyester resin that is produced by using the titanium type polymerization catalyst, the titanium component that is present in the resin as the catalyst residue works to heighten the catalytic activity of the cobalt type catalyst. In this case, therefore, there is no need of further adding the titanium catalyst component.

<Other Blending Agents>

The oxygen-absorbing resin composition of the present invention containing the above-mentioned components (A) to (C) can be suitably blended with any known blending agents depending upon the use.

The oxygen-absorbing resin composition can be suitably blended with the blending agents known per se., such as gas-barrier resin and the like so far as the above-mentioned organic oxygen absorber (B) and the catalyst component (C) are contained therein in amounts in predetermined ranges and the desired oxygen-absorbing capability is not hindered.

Namely, the resin composition containing the above-mentioned oxygen absorber (B) and the catalyst component (C) exhibits improved barrier property against oxygen upon absorbing oxygen by oxidation. However, the barrier property against oxygen decreases with the lapse of time. From the standpoint of effectively avoiding such an inconvenience and improving the service life of barrier property against oxygen, therefore, the above gas-barrier resin can be desirably used. Use of the gas-barrier resin also brings about an advantage of improving the barrier property against other gases (e.g., water vapor, carbonic acid gas, etc.), too.

As the gas-barrier resin, there can be representatively exemplified such polyamide resins as nylon 6, nylon 6•6, nylon 6/6•6 copolymer, polymetaxylylenediadipamide (MXD6), nylon 6•10, nylon 11, nylon 12 and nylon 13. Among these polyamides, the polymetaxylylenediadipamide having a terminal amino group in an amount of not less than 40 eq/$10^6$ g and, specifically, not less than 50 eq/$10^6$ g exhibits improved resistance against the deterioration by oxidation, and is desired.

As the gas-barrier resin other than the polyamide resin, further, there can be representatively used an ethylene-vinyl alcohol copolymer. There can be preferably used, for instance, a saponified product of a copolymer that is obtained by saponifying an ethylene-vinyl acetate copolymer having an ethylene content of 20 to 60% by mol and, specifically, 25 to 50% by mol so that the degree of saponification is not less than 96% and, specifically, not less than 99% by mol.

The gas-barrier resin should have a molecular weight large enough for forming films.

As the blending agents other than the gas-barrier resin, there can be exemplified filler, coloring agent, heat stabilizer, weathering stabilizer, antioxidant, aging stabilizer, photo stabilizer, ultraviolet ray absorber, antistatic agent, lubricants such as metal soap and wax, as well as resin for improvement and rubber.

<Preparation of the Oxygen-Absorbing Resin Composition and its Use>

The above oxygen-absorbing resin composition, in general, can be prepared by kneading the above-mentioned components in a non-oxidizing atmosphere by using an extruder or the like. It is, however, also allowable to employ such means as mixing some of the components in advance, and mixing the rest of the components afterwards.

For instance, part of the ethylene terephthalate type polyester resin used as the base resin (A) is melt-kneaded with the oxygen absorber (B) and the catalyst component (C) while effecting the deaeration by using a twin screw extruder to prepare master batch pellets thereof. Just prior to the use, the rest of the ethylene terephthalate type polyester resin is kneaded together therewith, and the mixture thereof is used for molding.

It is, further, desired that the above catalyst components (cobalt catalyst and titanium catalyst), for being homogeneously dispersed, is dissolved in a suitable organic solvent (organic solvent of the type of, for example, alcohol, ether, ketone or hydrocarbon) to prepare a solution thereof which is then mixed with other components in a kneading machine such as extruder. In this case, if the ethylene terephthalate type polyester resin obtained by using the titanium type polymerization catalyst has been used as the base resin, then the titanium catalyst does not have to be added as the catalyst component (C) as described earlier.

Despite of using the expensive cobalt catalyst in only a small amount, the oxygen-absorbing resin composition of the present invention exhibits excellent oxygen-absorbing capability and is very advantageous from the standpoint of cost. Moreover, being associated with the use of the cobalt catalyst in a small amount, it is made possible to avoid the base resin from being deteriorated by excess of oxidation and, therefore, to effectively avoid a decrease in the strength caused by oxidation and inconvenience such as developing color (developing yellow color). Besides, the oxygen-absorbing resin composition is free from by-producing low molecular decomposed products that could cause offensive odor when oxygen is absorbed. Namely, the oxygen-absorbing resin composition is very suited for use in the field of packaging materials since it prevents the contents from being deteriorated by oxidation and does not impair the flavor of the contents. Therefore, the oxygen-absorbing resin composition can be favorably used as a packaging material in such forms as film, sheet, cup, tray, bottle, tube and lid. The resin composition can, further, be used in the form of powder, film or sheet in order to absorb oxygen in the sealed packaging containers.

Moreover, the oxygen-absorbing resin composition of the present invention is free from by-producing low molecular decomposed products that could cause offensive odor when oxygen is absorbed. When the resin composition is used in the form of packaging containers such as bag, cup, bottle, tube and the like, therefore, the layer of the resin composition can be positioned on the side where it comes in contact with the content in the container. Therefore, the packaging container can be formed by using only the layer that comprises the resin composition.

With the packaging container of such a single-layer structure, it is allowed to decrease the thickness of the container wall by utilizing the excellent oxygen-barrier property of the layer that comprises the resin composition that absorbs oxygen. Therefore, it is made possible to reduce the weight of the container, to save resources and to decrease the cost.

The packaging container can be formed by a means known per se., such as extrusion-molding the resin composition into a film, and sticking the obtained film together by heat-sealing to form a bag-like container. It is also allowable to form a sheet-like or a test tube-like preform by the extrusion molding or the injection molding, and subjecting the preform to the secondary molding such as vacuum molding, expansion molding, stretch molding, compressed air molding, plug assist molding or blow-stretch molding to obtain a packaging container in the form of cup, tray or bottle. It is, further, allowable to directly obtain a tubular packaging container through extrusion molding, injection molding or direct-blow molding.

Moreover, the oxygen-absorbing resin composition of the present invention can be formed into a packaging container of a multilayer structure upon being combined with other resins or resin compositions. Upon molding the packaging container in a multilayer structure, it is made possible not only to further improve the barrier property against oxygen but also to improve the barrier property against the gases (e.g., carbonic acid gas and water vapor) in addition to oxygen and, besides, to sustain the oxygen-absorbing capability over extended periods of time.

As the multilayer structure, there can be exemplified the following layer constitutions. Here, the layer constitutions are abbreviated as described below.

OAR: Oxygen-absorbing layer formed by using the oxygen-absorbing resin composition of the present invention.
PET: Polyethylene terephthalate layer.
PE: Layer of a low-, medium- or high-density polyethylene, linear low-density polyethylene or linear very-low-density polyethylene.
PP: Polypropylene layer.
COC: Cyclic olefin resin layer.
GBAR: Gas-barrier layer of aromatic polyamide or ethylene vinyl alcohol copolymer.

Two-Layer Structure;
  PET/OAR
Three-Layer Structures;
  PE/OAR/PET
  PET/OAR/PET
  GBAR/OAR/PET
  PE/OAR/COC
Four-Layer Structures;
  PE/PET/OAR/PET
  PE/OAR/GBAR/PET
  PET/OAR/GBAR/PET
  PE/OAR/GBAR/COC
  PE/OAR/GBAR/PE
Five-Layer Structures;
  PET/OAR/PET/OAR/PET
  PE/PET/OAR/GBAR/PET
  PET/OAR/GBAR/COC/PET
  PET/OAR/PET/COC/PET
  PE/OAR/GBAR/COC/PET
  PE/GBAR/OAR/GBAR/PE
  PP/GBAR/OAR/GBAR/PP
Six-Layer Structures;
  PET/OAR/PET/OAR/GBAR/PET
  PE/PET/OAR/COC/GBAR/PET
  PET/OAR/GBAR/PET/COC/PET
  PE/GBAR/OAR/PE/GBAR/PE
  PP/EVOH/OAR/PP/GBAR/PP
Seven-Layer Structure;
  PET/OAR/COC/PET/GBAR/OAR/PET In the above multilayer structures, an embodiment that includes the gas-barrier resin layer (GBAR) is desired from the standpoint of sustaining the oxygen-absorbing capability of the oxygen-absorbing layer (OAR) for extended periods of time.

Either side of the above multilayered structures may be formed on the inner surface side or the outer surface side of the container.

If the adhesiveness is not sufficient among the layers, then layers of an adhesive resin such as olefin resin modified with an unsaturated carboxylic acid may be interposed among them.

By utilizing the multiplication of layers based on the co-extrusion or the co-injection, the packaging container of the multilayer structure is produced in the same manner as in the case of the single-layer structure described above.

The packaging container including the layer of the oxygen-absorbing resin composition of the invention exhibits excellent oxygen-barrier property owing to its excellent oxygen-absorbing capability. Either when it is formed in a single-layer structure or in a multilayer structure, therefore, the packaging container of the invention can be very favorably used for containing a variety of kinds of contents that are subject to be deteriorated in the presence of oxygen, such as beverages like beer, wine, fruit juice, carbonated soft drinks, as well as fruits, nuts, vegetables, meat products, infant foods, coffee, jam, mayonnaise, ketchup, edible oils, dressings, sauces, food boiled down in soy, milk products, medicines, cosmetics, gasoline and the like.

Owing to its excellent transparency, further, the packaging container of the invention can be also favorably used in a field where transparency is required.

EXAMPLES

The invention will be, further, described by using Examples to which only, however, the invention is in no way limited.

Determining the Amounts of Elements;

Elements such as titanium (Ti), antimony (Sb) and cobalt (Co) contained in the polyester resin used for the experiments were determined for their amounts by the method described below.

The sample was crushed into a powder by using a freeze-crushing machine. The powder was weighed to be about 0.5 g and was introduced into a sealed container equipped with a Teflon (registered trademark)-coated stainless steel jacket. After 6 ml of sulfuric acid and 3 ml of nitric acid were added thereto, the container was sealed. By using an electric furnace, the container was heated at 220° C. for 20 hours, and the powder was completely decomposed. Yttrium was added thereto as an internal standard substance. The mixture thereof was put into a graduated cylinder and to which ultra-pure water was added up to a graduate of 20 ml to obtain a solution for measurement. The solution was then measured by using an ICP emission analyzer (manufactured by Thermo Fisher Scientific Inc.)

Measuring the Concentration of Dissolved Oxygen;

Oxygen-free water having an oxygen concentration of almost zero was produced by using an apparatus for producing oxygen-free water (LOW DISSOLVED OXYGEN: manufactured by MIURA Co., Ltd.), and was introduced into a bottle that was obtained up to its full volume. The bottle was then sealed with a plastic cap. After stored in an air-conditioned room maintained at 23° C. 50% RH for one week, the water in the bottle was measured for its concentration of oxygen dissolved therein by using an instrument for measuring the concentration of oxygen dissolved in water (Oxygen Indicator: manufactured by Orbisphere Laboratories Co.).

<Polyester Resins (A) That are Used>

(A1) Ethylene terephthalate type polyester resin (5015W) produced by Shin-Kogosen Co., polymerization catalyst Sb (A2) Ethylene terephthalate type polyester resin (5512T) produced by Shin-Kogosen Co., polymerization catalyst Ti (A3) Ethylene terephthalate type polyester resin (CR8839T) produced by Kajun Co., polymerization catalyst Ti <Oxygen-Absorbing Component (B)>

In a nitrogen atmosphere, 6 kg of a hexamethylenediamine (produced by Toray Industries Co.) was dissolved in 57 kg of a 2-propanol, and to which was slowly added a mixture of methyltetrahydrophthalic anhydrides (HN-2200, manufactured by Hitachi Chemical Co.) containing 45% by weight of a 4-methyl-$\Delta^3$-tetrahydrophthalic anhydride and 21% by weight of a cis-3-methyl-$\Delta^4$-tetrahydrophthalic anhydride.

After the whole amount thereof was thrown in, the reaction was carried out at 100 to 160° C. for about 7 hours while removing the water that was formed and the solvent. There was obtained 16.7 kg of the oxygen-absorbing component (B).

<Transition Metal Catalyst (C)>

Cobalt neodecanoate (produced by OMG Co.)

<Production of Oxygen-Absorbing Resin Pellets>

By using a twin screw extruder equipped with a granulating facility (TEM-35B: manufactured by Toshiba Machine Co., Ltd.) with its barrel being set at a temperature of 260 to 280° C., the polyester resin (A) was mixed and kneaded with the oxygen-absorbing component (B) at a ratio of 10%, and was extruded in a stranded manner to thereby obtain oxygen-absorbing resin pellets. The oxygen-absorbing component (B) was added through an opening in the extruder by using a liquid feeder (Moineau pump, manufactured by Heishin Ltd.).

Example 1

An oxygen-absorbing resin composition prepared by dry-blending together the components of the following recipe was thrown into the hopper of a forming machine, and was injection-formed into a 25 g single-layer preform for forming a bottle.

| | |
|---|---|
| Polyester resin (A3) | 90 parts by mass, |
| Oxygen-absorbing resin pellets (using the polyester resin (A3) as the base material) | 10 parts by mass, |
| Transition metal catalyst (C) | 0.015 parts by mass. |

Next, the preform that was formed was biaxially stretch-blow-formed into a 500-mL bottle.

Table 1 shows the amounts (ppm) of elements contained in the bottle that was formed, amount of oxygen absorbed (% by weight) and concentration (ppm) of oxygen dissolved after one week has passed.

Example 2

A bottle was prepared by the same method as that of Example 1 but changing the recipe of the oxygen-absorbing resin composition as described below. The results were as shown in Table 1.

| | |
|---|---|
| Polyester resin (A3) | 90 parts by mass, |
| Oxygen-absorbing resin pellets (using the polyester resin (A3) as the base material) | 10 parts by mass, |
| Transition metal catalyst (C) | 0.010 parts by mass. |

Example 3

A bottle was prepared by the same method as that of Example 1 but changing the recipe of the oxygen-absorbing resin composition as described below. The results were as shown in Table 1.

| | |
|---|---|
| Polyester resin (A3) | 90 parts by mass, |
| Oxygen-absorbing resin pellets (using the polyester resin (A3) as the base material) | 10 parts by mass, |
| Transition metal catalyst (C) | 0.005 parts by mass. |

Example 4

A bottle was prepared by the same method as that of Example 1 but changing the recipe of the oxygen-absorbing resin composition as described below. The results were as shown in Table 1.

| | |
|---|---|
| Polyester resin (A3) | 85 parts by mass, |
| Oxygen-absorbing resin pellets (using the polyester resin (A3) as the base material) | 15 parts by mass, |
| Transition metal catalyst (C) | 0.030 parts by mass. |

Example 5

A bottle was prepared by the same method as that of Example 1 but changing the recipe of the oxygen-absorbing resin composition as described below. The results were as shown in Table 1.

| | |
|---|---|
| Polyester resin (A3) | 85 parts by mass, |
| Oxygen-absorbing resin pellets (using the polyester resin (A3) as the base material) | 15 parts by mass, |
| Transition metal catalyst (C) | 0.015 parts by mass. |

Example 6

A bottle was prepared by the same method as that of Example 1 but changing the recipe of the oxygen-absorbing resin composition as described below. The results were as shown in Table 1.

| | |
|---|---|
| Polyester resin (A3) | 90 parts by mass, |
| Oxygen-absorbing resin pellets (using the polyester resin (A1) as the base material) | 10 parts by mass, |
| Transition metal catalyst (C) | 0.015 parts by mass. |

Example 7

A bottle was prepared by the same method as that of Example 1 but changing the recipe of the oxygen-absorbing resin composition as described below. The results were as shown in Table 1.

| | |
|---|---|
| Polyester resin (A1) | 45 parts by mass, |
| Polyester resin (A3) | 45 parts by mass, |
| Oxygen-absorbing resin pellets (using the polyester resin (A1) as the base material) | 5 parts by mass, |
| Oxygen-absorbing resin pellets (using the polyester resin (A3) as the base material) | 5 parts by mass, |
| Transition metal catalyst (C) | 0.030 parts by mass. |

Comparative Example 1

A bottle was prepared by the same method as that of Example 1 but changing the recipe of the oxygen-absorbing resin composition as described below. The results were as shown in Table 1.

| | |
|---|---|
| Polyester resin (A1) | 90 parts by mass, |
| Oxygen-absorbing resin pellets (using the polyester resin (A1) as the base material) | 10 parts by mass, |
| Transition metal catalyst (C) | 0.050 parts by mass. |

Comparative Example 2

A bottle was prepared by the same method as that of Example 1 but changing the recipe of the oxygen-absorbing resin composition as described below. The results were as shown in Table 1.

| | |
|---|---|
| Polyester resin (A1) | 90 parts by mass, |
| Oxygen-absorbing resin pellets (using the polyester resin (A1) as the base material) | 10 parts by mass, |
| Transition metal catalyst (C) | 0.015 parts by mass. |

Comparative Example 3

A bottle was prepared by the same method as that of Example 1 but changing the recipe of the oxygen-absorbing resin composition as described below. The results were as shown in Table 1.

| | |
|---|---|
| Polyester resin (A3) | 90 parts by mass, |
| Oxygen-absorbing resin pellets (using the polyester resin (A3) as the base material) | 10 parts by mass, |
| Transition metal catalyst (C) | 0.050 parts by mass. |

Comparative Example 4

A bottle was prepared by the same method as that of Example 1 but changing the recipe of the oxygen-absorbing resin composition as described below. The results were as shown in Table 1.

| | |
|---|---|
| Polyester resin (A3) | 85 parts by mass, |
| Oxygen-absorbing resin pellets (using the polyester resin (A3) as the base material) | 15 parts by mass, |
| Transition metal catalyst (C) | 0.050 parts by mass. |

Comparative Example 5

A bottle was prepared by the same method as that of Example 1 but changing the recipe of the oxygen-absorbing resin composition as described below. The results were as shown in Table 1.

| | |
|---|---|
| Polyester resin (A2) | 90 parts by mass, |
| Oxygen-absorbing resin pellets (using the polyester resin (A2) as the base material) | 10 parts by mass, |
| Transition metal catalyst (C) | 0.050 parts by mass. |

Comparative Example 6

A bottle was prepared by the same method as that of Example 1 but changing the recipe of the oxygen-absorbing resin composition as described below. The results were as shown in Table 1.

| | |
|---|---|
| Polyester resin (A2) | 90 parts by mass, |
| Oxygen-absorbing resin pellets (using the polyester resin (A2) as the base material) | 10 parts by mass, |
| Transition metal catalyst (C) | 0.015 parts by mass. |

Comparative Example 7

A bottle was prepared by the same method as that of Example 1 but changing the recipe of the oxygen-absorbing resin composition as described below. The results were as shown in Table 1.

| | |
|---|---|
| Polyester resin (A2) | 90 parts by mass, |
| Oxygen-absorbing resin pellets (using the polyester resin (A2) as the base material) | 10 parts by mass, |

TABLE 1

| | Ti | Sb | Co | Oxygen-absorbing component | Concentration of dissolved oxygen |
|---|---|---|---|---|---|
| Example 1 | 7 | 0 | 21 | 1.0 | 0.220 |
| Example 2 | 7 | 0 | 14 | 1.0 | 0.207 |
| Example 3 | 7 | 0 | 7 | 1.0 | 0.345 |
| Example 4 | 7 | 0 | 42 | 1.5 | 0.118 |
| Example 5 | 7 | 0 | 21 | 1.5 | 0.106 |
| Example 6 | 6 | 17 | 22 | 1.0 | 0.266 |
| Example 7 | 3 | 87 | 47 | 1.0 | 0.141 |
| Com. Ex. 1 | 0 | 173 | 80 | 1.0 | 0.272 |
| Com. Ex. 2 | 0 | 173 | 31 | 1.0 | 0.940 |
| Com. Ex. 3 | 7 | 0 | 70 | 1.0 | 0.747 |
| Com. Ex. 4 | 7 | 0 | 70 | 1.5 | 0.348 |
| Com. Ex. 5 | 21 | 0 | 70 | 1.0 | 0.949 |
| Com. Ex. 6 | 21 | 0 | 21 | 1.0 | 0.860 |
| Com. Ex. 7 | 21 | 0 | 0 | 1.0 | 1.006 |

The invention claimed is:

1. An oxygen-absorbing resin composition containing an ethylene terephthalate polyester resin and an organic oxygen absorber and, further, containing cobalt in an amount of 5 to 50 ppm and titanium in an amount of 1 to 15 ppm calculated as elements, wherein the organic oxygen absorber is a bisimide compound derived from an acid anhydride and a diamine.

2. The oxygen-absorbing resin composition according to claim 1, wherein said cobalt is contained at a concentration of 10 to 30 ppm.

3. The oxygen-absorbing resin composition according to claim 1, wherein said organic oxygen absorber is contained in an amount of 0.5 to 2.0% by mass.

4. The oxygen-absorbing resin composition according to claim 1, wherein said acid anhydride is represented by the following formula (1):

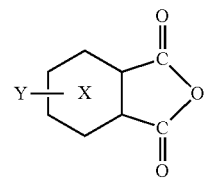

wherein the ring X is an aliphatic ring having an unsaturated bond, and Y is an alkyl group.

5. The oxygen-absorbing resin composition according to claim 1, wherein said organic oxygen absorber has a molecular weight of not more than 1000.

6. The oxygen-absorbing resin composition according to claim 4, wherein said organic oxygen absorber is an aliphatic bisimide compound derived from said acid anhydride and an aliphatic diamine.

7. A formed body of a single-layer or a multilayer structure having a layer formed by using the oxygen-absorbing resin composition described in claim 1.

8. The formed body according to claim 7, wherein the formed body is a container.

9. The formed body according to claim 7, wherein the formed body is a preform for forming a container.

* * * * *